United States Patent
Sakaue et al.

(10) Patent No.: US 11,747,610 B2
(45) Date of Patent: Sep. 5, 2023

(54) OPTICAL SCANNING DEVICE AND IMAGE FORMING APPARATUS

(71) Applicant: Ricoh Company, Ltd., Tokyo (JP)

(72) Inventors: Yoshinobu Sakaue, Kanagawa (JP); Takeshi Yamakawa, Kanagawa (JP); Susumu Narita, Tokyo (JP); Ryo Sato, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 329 days.

(21) Appl. No.: 17/221,313

(22) Filed: Apr. 2, 2021

(65) Prior Publication Data

US 2021/0318536 A1   Oct. 14, 2021

(30) Foreign Application Priority Data

Apr. 10, 2020  (JP) .................................. 2020-070962

(51) Int. Cl.
*G02B 26/10* (2006.01)
*G02B 26/08* (2006.01)

(52) U.S. Cl.
CPC ......... *G02B 26/10* (2013.01); *G02B 26/0816* (2013.01)

(58) Field of Classification Search
None
See application file for complete search history.

(56) References Cited

U.S. PATENT DOCUMENTS

| 2006/0139440 | A1 | 6/2006 | Tomita |
| 2007/0053040 | A1 | 3/2007 | Sakaue et al. |
| 2007/0146851 | A1* | 6/2007 | Nakajima ............ G02B 26/105 359/213.1 |
| 2007/0153079 | A1 | 7/2007 | Sakaue et al. |
| 2009/0015897 | A1* | 1/2009 | Nakamura ........... H04N 1/1135 359/205.1 |
| 2009/0022520 | A1 | 1/2009 | Sakaue et al. |
| 2009/0058981 | A1 | 3/2009 | Higaki et al. |
| 2009/0066780 | A1 | 3/2009 | Bannai et al. |
| 2009/0295899 | A1 | 12/2009 | Watanabe et al. |

(Continued)

FOREIGN PATENT DOCUMENTS

| JP | 2002-196269 | 7/2002 |
| JP | 2003-202512 | 7/2003 |

(Continued)

*Primary Examiner* — Jennifer D. Carruth
(74) *Attorney, Agent, or Firm* — XSENSUS LLP

(57) ABSTRACT

An optical scanning device includes light sources, a deflector, an optical element, and light blockers. The light blockers are spaced apart in a rotation direction of the deflector. An inequality θ1<θ2 is satisfied, where when viewed from the rotation axis direction, θ1 is an angle formed by a line segment connecting the end portion of a light blocker disposed most downstream in the rotation direction to a rotation axis center of the deflector and a line segment connecting the end portion of a light blocker disposed most upstream in the rotation direction to the rotation axis center, and θ2 is an angle formed by a line segment connecting an upstream end portion of one mirror surface in the rotation direction to the rotation axis center and a line segment connecting a downstream end portion of the one mirror surface in the rotation direction to the rotation axis center.

7 Claims, 11 Drawing Sheets

(56) References Cited

U.S. PATENT DOCUMENTS

| | | |
|---|---|---|
| 2010/0033787 A1 | 2/2010 | Serizawa et al. |
| 2010/0060965 A1* | 3/2010 | Oda .................... G02B 26/123 |
| | | 359/216.1 |
| 2010/0321461 A1 | 12/2010 | Shoji et al. |
| 2011/0316957 A1 | 12/2011 | Sakaue et al. |
| 2011/0316958 A1 | 12/2011 | Johno et al. |
| 2012/0062685 A1 | 3/2012 | Serizawa et al. |
| 2012/0300007 A1 | 11/2012 | Fujii et al. |
| 2013/0070042 A1 | 3/2013 | Yamakawa et al. |
| 2013/0188004 A1 | 7/2013 | Arai et al. |
| 2013/0194370 A1 | 8/2013 | Sakaue et al. |
| 2013/0251407 A1 | 9/2013 | Serizawa et al. |
| 2014/0354757 A1 | 12/2014 | Narita et al. |
| 2015/0153705 A1 | 6/2015 | Sakaue et al. |
| 2016/0161906 A1 | 6/2016 | Watanabe et al. |
| 2018/0356759 A1 | 12/2018 | Narita et al. |
| 2019/0286005 A1 | 9/2019 | Nishina et al. |
| 2021/0318536 A1* | 10/2021 | Sakaue ................ G02B 26/123 |

FOREIGN PATENT DOCUMENTS

| | | |
|---|---|---|
| JP | 2006-195421 | 7/2006 |
| JP | 2007-072090 | 3/2007 |
| JP | 2008-233919 | 10/2008 |
| JP | 2013-238742 | 11/2013 |

* cited by examiner

FIG. 6A1
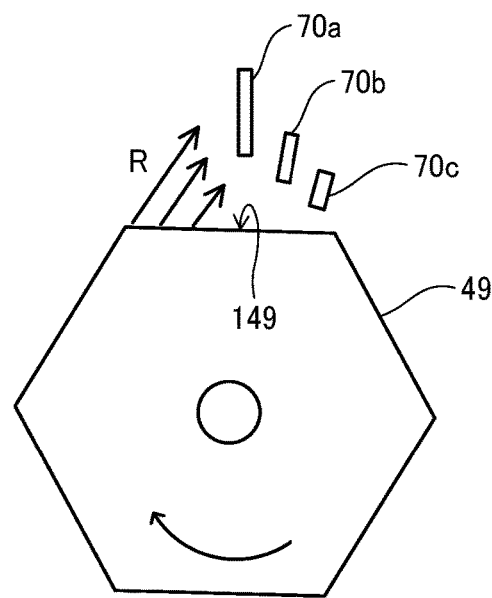
FIG. 6A2
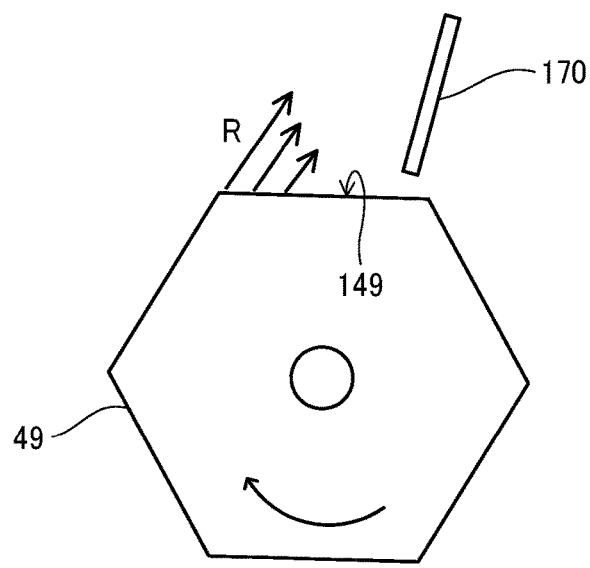
FIG. 6B1
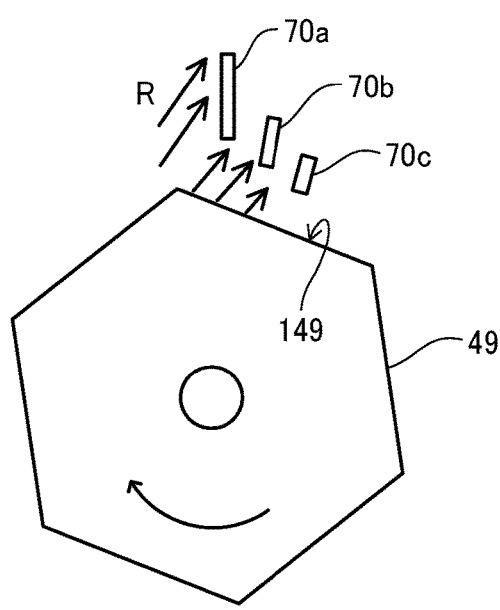
FIG. 6B2
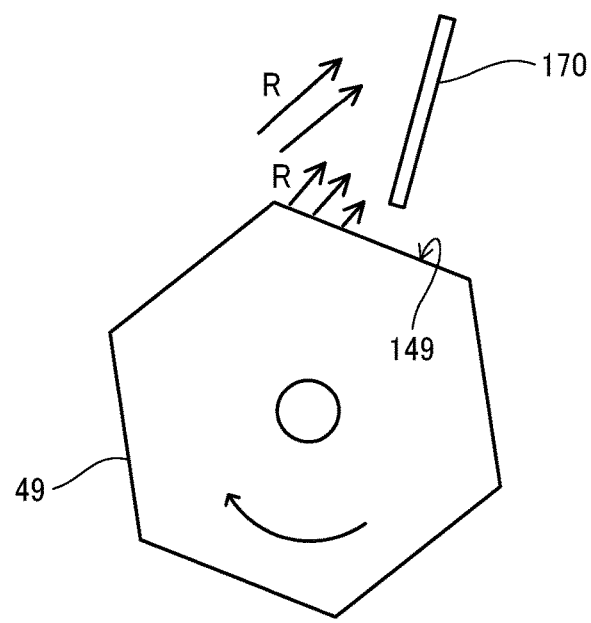

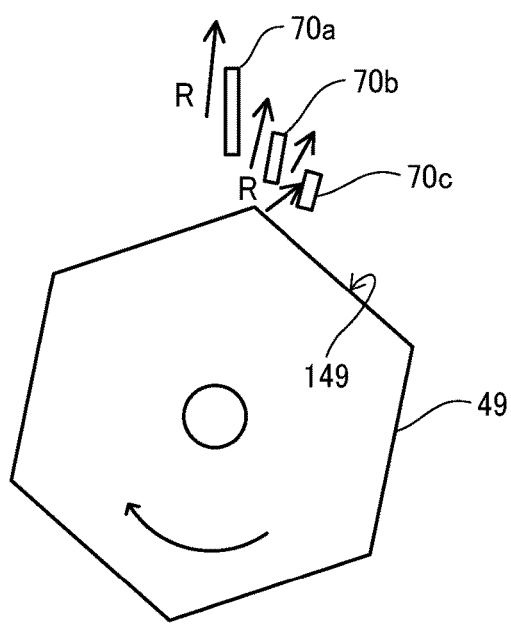 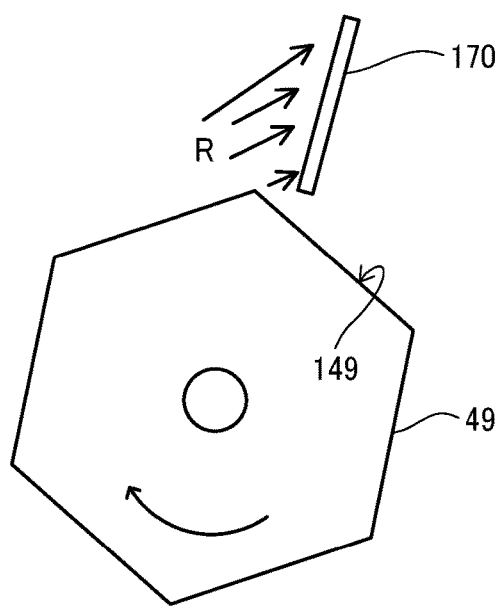
FIG. 6C1  FIG. 6C2

------- SINGLE LIGHT BLOCKING WALL
— — SECOND LIGHT BLOCKING WALL
—— TOTAL SUM
——— THIRD LIGHT BLOCKING WALL
--- FIRST LIGHT BLOCKING WALL

OPTICAL SCANNING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2020-070962, filed on Apr. 10, 2020, in the Japan Patent Office, the entire disclosure of which is hereby incorporated by reference herein.

BACKGROUND

Technical Field

Embodiments of the present disclosure relate to an optical scanning device and an image forming apparatus.

Discussion of the Background Art

There are known optical scanning devices that include a plurality of light sources, a deflector that has a plurality of mirror surfaces and reflects light beams from the plurality of light sources on the plurality of mirror surfaces while rotating to deflect the light beams into two different directions, an optical element that guides a corresponding one of the light beams deflected by the deflector to a corresponding body to be scanned to form an image on the body to be scanned, and a plurality of light blockers that is disposed adjacent to the deflector and blocks flare light from an opposite optical element.

SUMMARY

In an aspect of the present disclosure, there is provided an optical scanning device that includes a plurality of light sources, a deflector, an optical element, and a plurality of light blockers. The deflector includes a plurality of mirror surfaces and is configured to reflect light beams from the plurality of light sources on the plurality of mirror surfaces while rotating to deflect the light beams into different directions from each other. The optical element faces the deflector and is configured to guide each one of the light beams deflected by the deflector to corresponding one of a plurality of bodies to be scanned to form an image on the corresponding one of the plurality of bodies to be scanned. The plurality of light blockers are disposed adjacent to the deflector and configured to block flare light from the optical element facing the deflector, each one of the light blockers having an end portion located toward the deflector. When viewed from a rotation axis direction of the deflector, the plurality of light blockers are spaced apart from each other in a rotation direction of the deflector. An inequality $\theta1<\theta2$ is satisfied, in which, when viewed from the rotation axis direction, $\theta1$ is an angle formed by a line segment connecting the end portion of a light blocker disposed most downstream in the rotation direction among the plurality of light blockers to a rotation axis center of the deflector and a line segment connecting the end portion of a light blocker disposed most upstream in the rotation direction among the plurality of light blockers to the rotation axis center, and $\theta2$ is an angle formed by a line segment connecting an upstream end portion of one of the plurality of mirror surfaces in the rotation direction to the rotation axis center and a line segment connecting a downstream end portion of the one of the plurality of mirror surfaces in the rotation direction to the rotation axis center.

In another aspect of the present disclosure, there is provided an image forming apparatus that includes a latent image bearer having a surface, the optical scanning device, a developing device, and a transfer device. The optical scanning device is configured to irradiate the surface of the latent image bearer with light to form a latent image on the surface. The developing device is configured to develop the latent image to obtain an image. The transfer device is configured to transfer the image onto a recording material to form an image on the recording material.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIGS. 6A1, 6B1, and 6C1 are illustrations of a flow of air pushed out by a mirror surface of a polygon mirror in the optical scanning device of FIG. 5;

FIGS. 6A2, 6B2, and 6C2 are illustrations of a flow of air pushed out by a mirror surface of a polygon mirror in the case of the single light blocking wall of FIG. 4;

Figure 1:
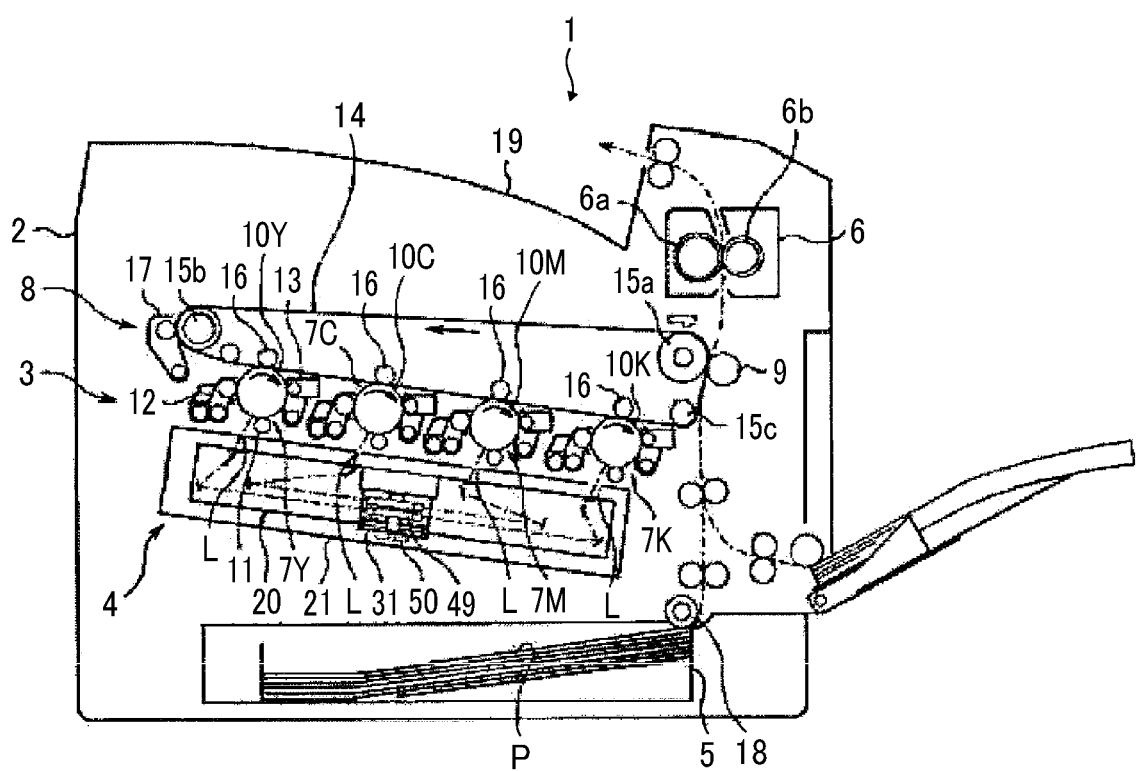
FIG. 1 is a schematic view illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results. Although the embodiments are described with technical limitations with reference to the attached drawings, such description is not intended to limit the scope of the disclosure and all of the components or elements described in the embodiments of this disclosure are not necessarily indispensable. Referring now to the drawings, embodiments of the present disclosure are described below. In the drawings for explaining the following embodiments, the same reference codes are allocated to elements (members or components) having the same function or shape and redundant descriptions thereof are omitted below.

A color image forming apparatus as an image forming apparatus according to an embodiment of the present disclosure is described below with reference to FIG. 1.

FIG. 1 is a schematic view illustrating a configuration of an image forming apparatus according to an embodiment of the present disclosure.

As illustrated in FIG. 1, a full color image forming apparatus, presented as an example, includes a plurality of photoconductors as latent image bearers, specifically, four drum-like photoconductors 10Y, 10C, 10M, and 10K disposed in tandem. The photoconductors 10Y, 10C, 10M, and 10K are portions of respective image formation devices 7Y, 7C, 7M, and 7K, which are image forming devices. The image formation devices 7Y, 7C, 7M, and 7K correspond to yellow, cyan, magenta, and black, respectively, forming images of the respective colors.

The image forming apparatus of the type illustrated in FIG. 1 includes an intermediate transfer belt 14 as a surface moving element, which rotates while supported by three support rollers 15a, 15b, and 15c. The image formation devices 7Y, 7C, 7M, and 7K are disposed, spaced apart from one another, along the lower stretch line of the intermediate transfer belt 14 in the order set forth from upstream in a moving direction of the intermediate transfer belt 14 indicated by an arrow.

In formation of full color images, toner images are formed on the photoconductors 10Y, 10C, 10M, and 10K of the image formation devices 7Y, 7C, 7M, and 7K as described blow, the images having respective colors. Then, as the intermediate transfer belt 14 moves, the toner images having different colors are sequentially transferred onto the intermediate transfer belt 14, superimposed on one another, due to the functions of primary transfer rollers 16 serving as transfer devices. Each of the primary transfer rollers 16 is disposed facing the corresponding photoconductor across the intermediate transfer belt 14. Specifically, a position on the intermediate transfer belt 14 at which the primary transfer roller 16 is in contact with the intermediate transfer belt 14 is called a transfer position. Transfer is performed at the transfer position.

Four toner images superimposed and transferred are simultaneously transferred onto a recording material, which is a final recording medium, at a nip portion between the support roller 15a and a secondary transfer roller 9. The recording material is then conveyed between paired fixing rollers of a fixing device 6 and, via a conveying roller, ejected from a sheet ejection roller pair to a sheet ejection tray 19. A full color image is thus obtained on the recording material.

The intermediate transfer belt 14 is caused to stay in contact with the photoconductor 10K by the primary transfer roller 16 to enable a one-color formation mode for black images. The intermediate transfer belt 14 is brought in contact with and moved away from the other photoconductors due to the functions of movable tension rollers. To remove residual toner from the intermediate transfer belt 14, a cleaning device 17 is disposed to the support roller 15b.

Although handling toner of different colors, the image formation devices 7Y, 7C, 7M, and 7K have a common mechanical configuration and perform a common image formation process. Thus, in FIG. 1, constituent elements of the image formation devices 7Y, 7C, 7M, and 7K, except for the photoconductors, are assigned identical reference signs, and the configuration and image formation process of any one of the image formation devices, for example, the image formation device 7Y, is described below.

In the image formation device 7Y, elements are disposed in the vicinity of the photoconductor 10Y such as, in a clockwise direction in FIG. 1, a charging roller 11 serving as a charging device to charge the photoconductor 10Y, an irradiation position of a light beam L, a developing device 12 serving as a developing device, the primary transfer roller 16, and a cleaning device 13.

The light beam L is emitted by an optical scanning device 4 serving as an optical scanning device. The optical scanning device 4 internally includes a semiconductor laser as a light source, a coupling lens, an fθ lens, a toroidal lens, a mirror, and a rotating polygon mirror. The optical scanning device 4 emits a light beam L toward each photoconductor for the corresponding color. The optical scanning device 4 irradiates the photoconductor 10Y at the writing position to form an electrostatic latent image. Details are described below.

The developing device 12 of the image formation device 7Y, for example, stores the yellow developer and turns a latent image into a visible image as a yellow image. The other image formation devices also store the developer of the respective colors and turn latent images into visible images in respective colors of the stored developer.

In forming an image, the photoconductor 10Y is charged uniformly by the charging roller 11 while the photoconductor 10Y rotates. At the writing position, the photoconductor 10Y is irradiated with the light beam L including information on the yellow image to form an electrostatic latent image. The latent image is rendered visible with the yellow toner while passing the developing device.

The yellow toner image on the photoconductor 10Y is transferred onto the intermediate transfer belt 14 by the primary transfer roller 16. On the yellow toner image on the intermediate transfer belt 14, a cyan toner image, a magenta toner image, and a black toner image are sequentially superimposed and transferred by the image formation device 7C, the image formation device 7M, and the image formation device 7K, respectively. A full color toner image is thus formed.

The recording material is conveyed from a sheet feeder 5 and a registration roller, timed to reach the secondary transfer roller 9 at the same timing as the superimposed toner images reach the secondary transfer roller 9. As described above, the superimposed images are simultaneously transferred onto the recording material at the nip portion between the support roller 15a and the secondary transfer roller 9.

After the transfer, residual toner is removed from the photoconductor by the cleaning device 13 and then static charge is removed from the photoconductor by a charge removal lamp so that the photoconductor is ready for subsequent image forming. Residual toner is also removed from the intermediate transfer belt 14 by the cleaning device 17.

In the case of the exemplary image forming apparatus described herein, toner images on the photoconductors are superimposed and transferred onto the intermediate transfer belt 14 and then the superimposed toner images are simultaneously transferred onto a sheet medium. A known type of color image forming apparatus includes a recording sheet conveying belt as the surface moving element in place of the intermediate transfer belt. This type of color image forming apparatus conveys a recording material on the recording sheet conveying belt and, in the process of conveyance, color toner images on photoconductors are sequentially superimposed and transferred onto the recording material to form a full color image. An image forming apparatus according to an embodiment of the present disclosure may be any type of image forming apparatus.

The optical scanning device 4 is described next.

Figure 2:
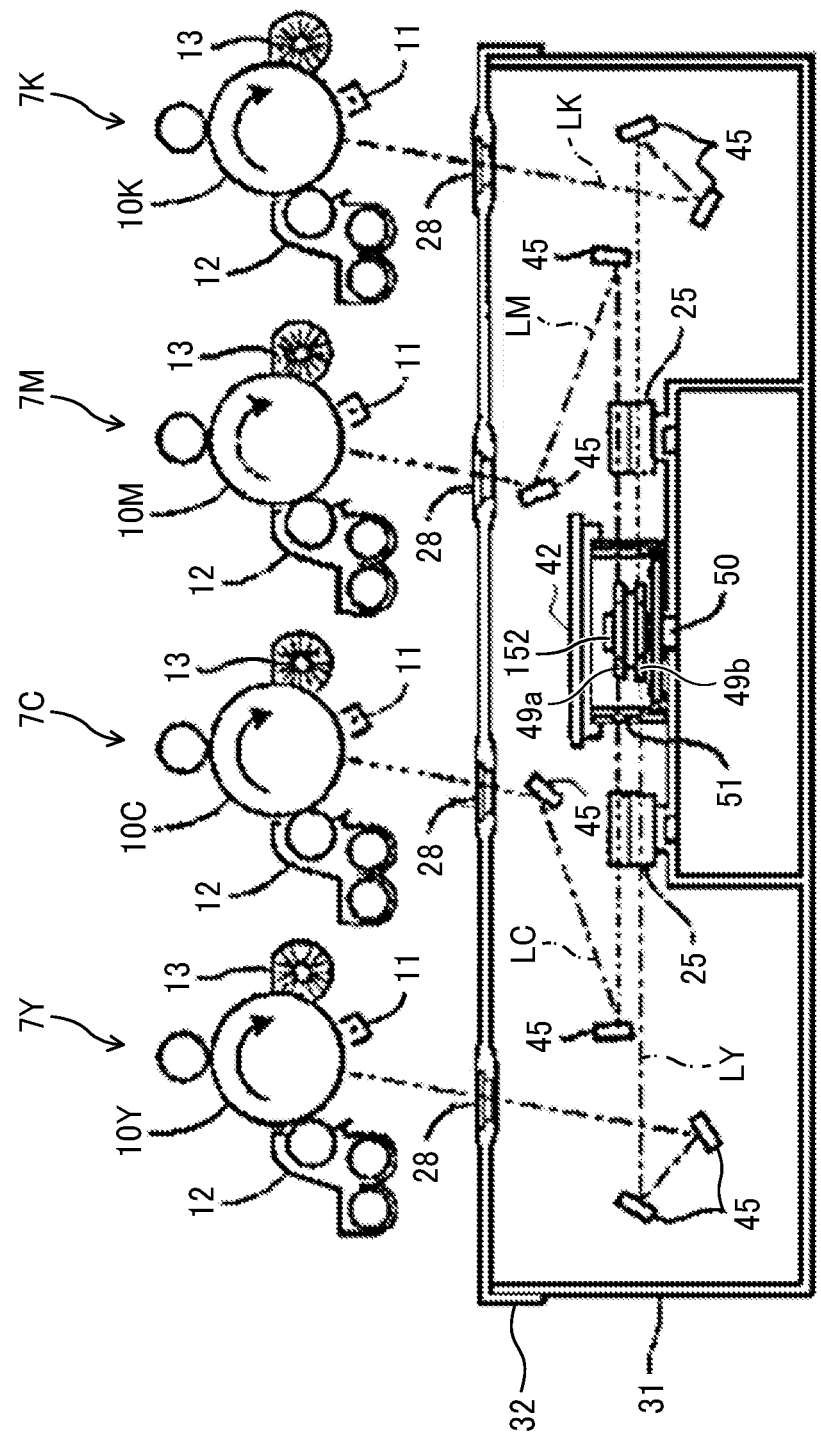
FIG. 2 is a schematic cross-sectional view of an optical scanning device according to an embodiment of the present disclosure.

FIG. 2 is a schematic cross-sectional view of the optical scanning device 4, illustrating a configuration of the optical scanning device 4.

Figure 3:
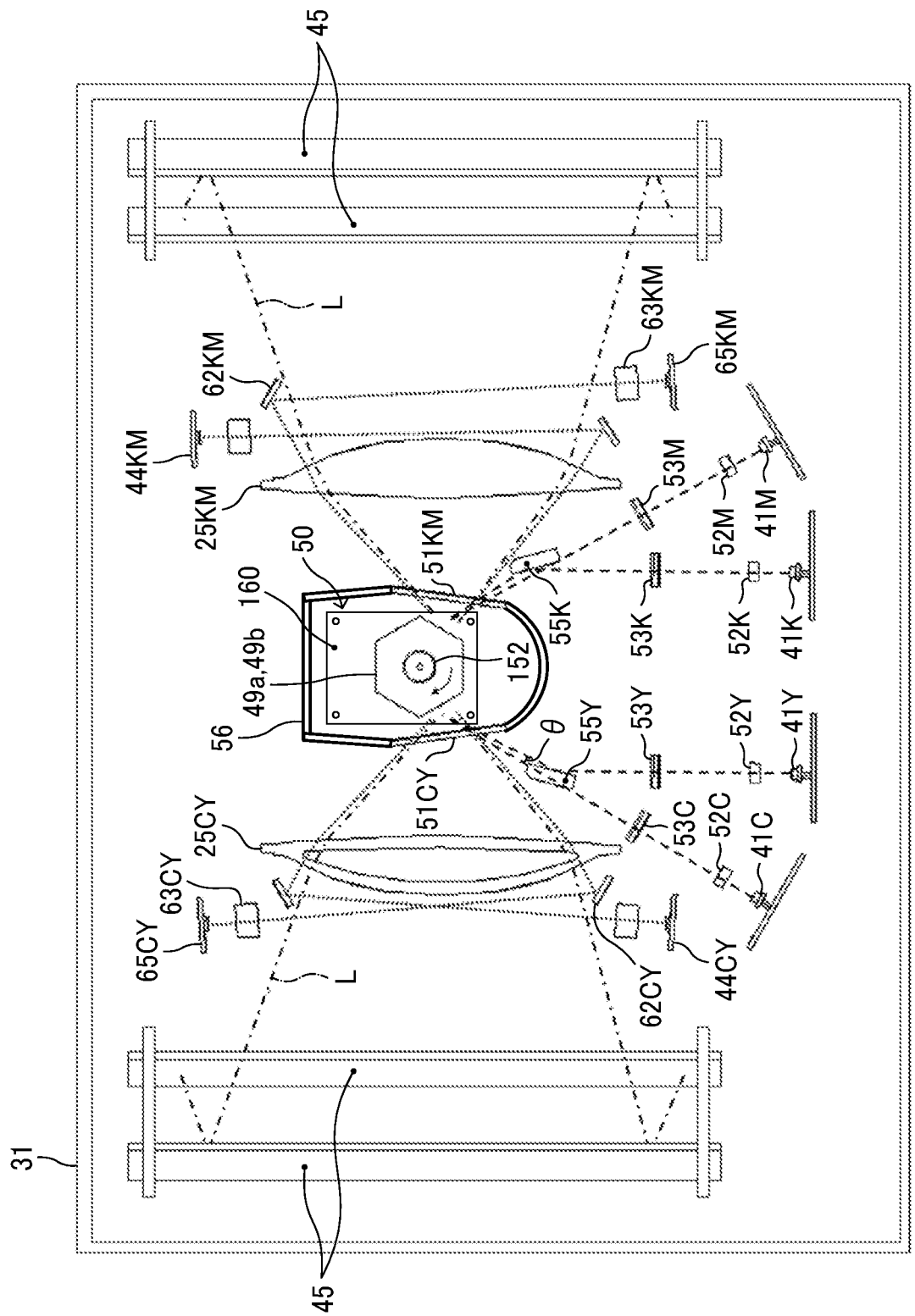
FIG. 3 is a schematic view of the optical scanning device of FIG. 2 as viewed from above.

FIG. 3 is a schematic view of the optical scanning device 4 as viewed from above.

The optical scanning device 4 includes a polygon scanner 50 and optical elements including different types of reflecting mirrors and different types of lenses. The polygon scanner 50 is disposed substantially at the center of the optical scanning device 4, situated in an enclosed space surrounded by soundproof glass 51, a soundproof wall 56, and an upper wall 42.

The polygon scanner 50 includes an upper polygon mirror 49a having six mirror surfaces, which is a deflector, a lower polygon mirror 49b, which is a deflector, a polygon motor for rotating the polygon mirrors, and a control board 160 for controlling the polygon motor.

As illustrated in FIG. 2, an M optical system and a K optical system are disposed on the right-hand side of the polygon scanner 50. A Y optical system and a C optical system are disposed on the left-hand side of the polygon scanner 50 as illustrated in FIG. 2. The Y optical system and the K optical system are point-symmetrical with respect to a rotation shaft 152 of the polygon scanner 50. The C optical system and the M optical system are point-symmetrical with respect to the rotation shaft 152 of the polygon scanner 50.

As illustrated in FIG. 3, semiconductor lasers 41K, 41M, 41C, and 41Y, which are light sources, are disposed to emit respective light beams Lk, Lm, Lc, and Ly that correspond to the photoconductors 10K, 10M, 10C, and 10Y, respectively.

On the optical paths of the light beams from the semiconductor lasers 41 to the polygon scanner 50, collimator lenses 52K, 52M, 52C, and 52Y, imaging forming lenses (cylinder lenses) 53K, 53M, 53C, and 53Y, and reflecting mirrors 55K and 55Y are disposed. Scanning lenses (fθ lenses) 25KM and 25CY and a plurality of mirrors 45, which are optical elements, are disposed on optical paths from the polygon scanner 50 to the photoconductors 10, which are bodies to be scanned. Elongated lenses corresponding to the colors may be disposed on the optical paths from the polygon scanner 50 to the photoconductors 10, which are bodies to be irradiated.

In the lower right region of FIG. 3, a leading end beam detection unit 65KM is disposed, which is a beam sensor for detecting leading ends of the light beams Lm and Lk for M color and K color. In the upper right region of FIG. 3, a trailing end beam detection unit 44KM is disposed, which is a beam sensor for detecting trailing ends of the light beams Lm and Lk for M color and K color. A leading end beam detection unit 65CY is disposed at a position (in the upper left region of FIG. 3) that allows the leading end beam detection unit 65CY for C and Y and the leading end beam detection unit 65KM for M and K to have point symmetry about the rotation shaft 152 of the polygon scanner 50. A trailing end beam detection unit 44CY is disposed at a position (in the lower left region of FIG. 3) that allows the trailing end beam detection unit 44CY for C and Y and the trailing end beam detection unit 44KM for M and K to have point symmetry about the rotation shaft 152 of the polygon scanner 50.

The light beams Lk, Lm, Lc, and Ly from the semiconductor lasers 41K, 41M, 41C, and 41Y are converted from divergent rays to parallel rays by the collimator lenses 52K, 52M, 52C, and 52Y, respectively. The light beams Lk, Lm, Lc, and Ly then pass through the imaging forming lenses 53K, 53M, 53C, and 53Y to be condensed in a sub-scanning direction (which is a direction corresponding to a photoconductor surface moving direction on the photoconductor surface), respectively.

The light beam Lk is reflected by the reflecting mirror 55K to pass through soundproof glass 51KM and become incident on a mirror surface of the lower polygon mirror 49b. The light beam Lk incident on the mirror surface of the side face of the lower polygon mirror 49b is deflected to scan in a main scanning direction. The light beam Lk deflected by the lower polygon mirror 49b re-passes through the soundproof glass 51 and is condensed by the scanning lens 25KM (fθ lens). The light beam Lk for K color condensed by the scanning lens 25KM is reflected by a folding mirror 62KM. The light beam Lk then passes through a synchronization imaging forming lens 63KM to become incident on the leading end beam detection unit 65KM for detection of the light beam Lk prior to scanning of the photoconductor 10K. When the leading end beam detection unit 65KM detects the light beam Lk, a synchronization signal is output. In response to the synchronization signal, output timing is adjusted for a light source signal resulting from conversion based on image data.

In a manner similar to the description provided above, the light beam Lk emitted based on the image data that is input passes through the imaging forming lens 53K and via the other elements. The light beam Lk is then deflected by the lower polygon mirror 49b and become incident on the scanning lens 25KM. As illustrated in FIG. 2, the light beam Lk incident on the scanning lens 25KM travels via the mirror 45 and dustproof glass 28 to irradiate the photoconductor 10K.

The light beam Lm that has passed through the imaging forming lens 53M directly becomes incident on the mirror surface of the upper polygon mirror 49a and is deflected to scan. The light beam Lm for M color deflected by the upper polygon mirror 49a becomes incident on the scanning lens 25KM. The light beam Lm then becomes incident on the leading end beam detection unit 65KM for output of a synchronization signal prior to scanning of the photoconductor 10M. The light beam Lm synchronized and emitted based on image data travels via the upper polygon mirror 49a, scanning lens 25KM, mirror 45, and dustproof glass 28 to irradiate the photoconductor 10M.

The light beam Lc that has passed through the imaging forming lens 53C directly becomes incident on the mirror surface of the upper polygon mirror 49a and is deflected to scan. The light beam Lc for C color deflected by the upper polygon mirror 49a becomes incident on the scanning lens 25CY. The light beam Lc is then reflected by a folding mirror 62CY to pass through a synchronization imaging forming lens 63CY and become incident on the leading end beam detection unit 65CY for output of a synchronization signal prior to scanning of the photoconductor 10C. The light beam Lc synchronized and emitted based on image data travels via the imaging forming lens 53C, upper polygon mirror 49a, scanning lens 25CY, mirror 45, and dustproof glass 28 to irradiate the photoconductor 10C.

The light beam Ly that has passed through the imaging forming lens 53Y is reflected by the reflecting mirror 55Y. The light beam Ly then becomes incident on the mirror surface of the lower polygon mirror 49b and is deflected to scan. The light beam Ly for Y color deflected by the lower polygon mirror 49b passes through the scanning lens 25CY. The light beam Ly then becomes incident on the leading end beam detection unit 65CY for output of a synchronization signal prior to scanning of the photoconductor 10Y. The light beam Ly synchronized and emitted based on image data travels via the imaging forming lens 53Y, lower polygon mirror 49b, scanning lens 25CY, mirror 45, and dustproof glass 28 to irradiate the photoconductor 10Y.

Figure 4:
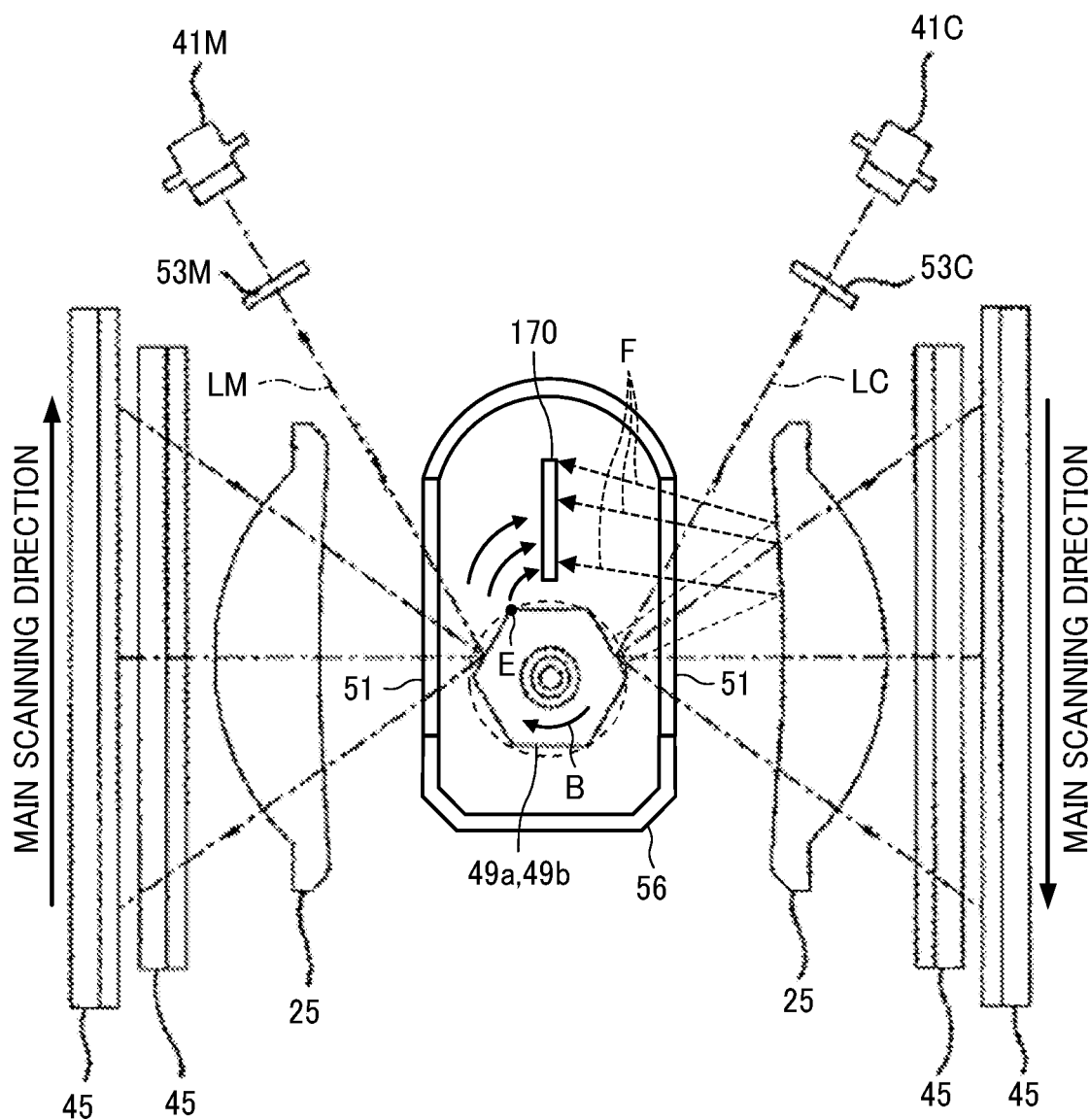
FIG. 4 is a top view of a portion of an optical scanning device including a single light blocking wall according to a comparative example.

In the optical scanning device 4, a portion of a light beam incident on the scanning lens 25 reflects off the scanning lens 25 to generate flare light F as illustrated in FIG. 4. The flare light F passes through the soundproof glass 51 and near the polygon mirrors 49, passing through the soundproof glass on the opposite side. The flare light F reaching the photoconductor 10 and exposing the surface of the photoconductor 10 may result in an abnormal image such as streaks. To provide a solution, there has been a case, as illustrated in FIG. 4, where a light blocking wall 170 is provided as a light blocker that blocks the flare light F. This light blocking wall 170 is placed adjacent to the polygon mirrors 49 on the optical path of the flare light F that reaches the surface of the photoconductor 10.

The polygon mirrors 49 each have a regular hexagon shape when viewed from a rotation axis direction of the polygon mirrors 49 and have six mirror surfaces. When the polygon mirrors 49 rotate, the mirror surfaces of the polygon mirrors 49 push out air, generating airflow in the vicinity of the polygon mirrors flowing in the same direction as the polygon mirror rotation direction (see arrow B in FIG. 4). The airflow may cause the light blocking wall 170 to vibrate, generating noise.

Airflow generated due to the rotation of the polygon mirrors 49 hits the light blocking wall 170, applying wind pressure to the light blocking wall 170 in the rotation direction of the polygon mirrors 49. The wind pressure causes the light blocking wall 170 to undergo elastic deformation in the rotation direction of the polygon mirrors 49. Airflow hitting the light blocking wall 170 gradually increases as an upstream end portion E of a mirror surface in the rotation direction approaches the light blocking wall 170. The airflow reaches a maximum level when the upstream end portion E passes an opposing portion of the light blocking wall 170. When the upstream end portion E has passed the opposing portion of the light blocking wall 170, airflow hitting the light blocking wall 170 suddenly weakens, decreasing the wind pressure on the light blocking wall 170 rapidly. As a result, the light blocking wall 170 that has undergone elastic deformation in the rotation direction of the polygon mirrors 49 is restored. The light blocking wall repeats this behavior six times for each rotation of the polygon mirrors, resulting in the light blocking wall vibrating at intervals of one sixth of the revolutions per minute (rpm) of the polygon mirrors. The vibration may cause noise.

In contrast, in the present embodiment, the light blocking wall 170 is divided so that airflow generated due to the rotation of the polygon mirrors 49 is dispersed among a plurality of light blocking walls to reduce vibration in each light blocking wall. Noise due to the vibration of the light blocking walls will thus be reduced. Detailed description is provided below with reference to the drawings.

Figure 5:
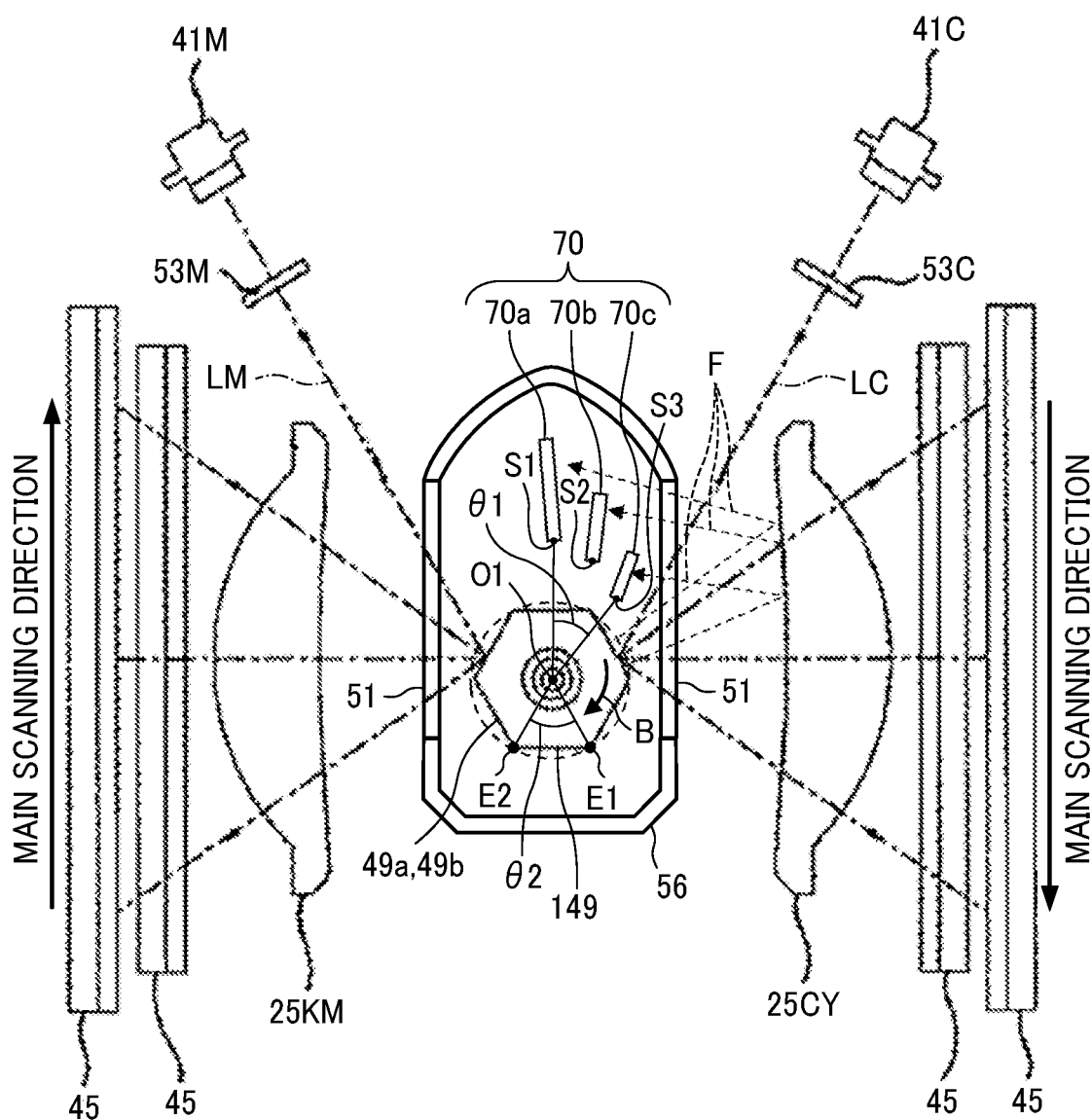
FIG. 5 is a top view of a portion of an optical scanning device including light blocking walls according to an embodiment of the present disclosure.

FIG. 5 is a stop view of a portion of the optical scanning device, illustrating a configuration of light blocking walls according to the present embodiment.

As illustrated in FIG. 5, the optical scanning device 4 according to the present embodiment includes a light blocking structure 70 including three light blocking walls 70a, 70b, and 70c. The three light blocking walls 70a, 70b, and 70c are disposed at a predetermined spacing in the rotation direction of the polygon mirrors 49. The three light blocking walls 70a, 70b, and 70c have respective first end portions S1, S2, and S3 that are located toward the polygon mirror. The three light blocking walls 70a, 70b, and 70c have respective second end portions that are located away from the polygon mirror. Among the three light blocking walls, the first light blocking wall 70a is disposed at a most upstream location in the polygon mirror rotation direction. The third light blocking wall 70c is disposed at a most downstream location in the polygon mirror rotation direction. A line connecting the first end portion S1 to a rotation axis center O1 of the polygon mirrors 49 and a line connecting the first end portion S3 to the rotation axis center O1 form an angle θ1. A line connecting one end E1 of a mirror surface of the polygon mirror 49 in the rotation direction to the rotation axis center O1 and a line connecting another end E2 of the mirror surface in the rotation direction to the rotation axis center O1 form an angle θ2 (60° in the present embodiment). The angle θ1 is smaller than the angle θ2 (θ1<θ2). Thus, the three light blocking walls 70a, 70b, and 70c of the light blocking structure 70 are disposed so as to be within a width of the mirror surface.

The light blocking walls located further downstream in the polygon mirror rotation direction have shorter distances from the respective first end portions to the polygon mirror 49, the first end portions being located toward the polygon mirror 49. The configuration described above can allow airflow generated due to the rotation of the polygon mirrors 49 to disperse and hit the plurality of light blocking walls, thus capable of reducing wind pressure on each light blocking wall, as described below.

The three light blocking walls have different lengths with the third light blocking wall 70c, disposed closest to the polygon mirror 49, having the shortest length and the first light blocking wall 70a, disposed farthest away from the polygon mirror, having the longest length.

The first end portion S2, located toward the polygon mirror, of the second light blocking wall 70b is closer to the polygon mirror than the second end portion, located away from polygon mirror, of the third light blocking wall 70c is.

The first end portion S1 of the first light blocking wall 70a is closer to the polygon mirror than the second end portion of the second light blocking wall 70b is. When the light blocking structure 70 is viewed from upstream in a travel direction of flare light F, a portion of the second light blocking wall 70b overlaps with the third light blocking wall 70c, the portion being located toward the polygon mirror. Also, a portion of the first light blocking wall 70a overlaps with the second light blocking wall 70b, the portion being located toward the polygon mirror. Thus, flare light can be prevented from leaking from between the light blocking walls.

Note that flare light that has reflected off a lower portion of the scanning lens 25 in FIG. 5 is blocked by the soundproof wall 56 and will not reach the photoconductors 10.

FIGS. 6A1, 6B 1, and 6C1 are illustrations of a flow of air pushed out by a mirror surface 149 of the polygon mirror in the present embodiment.

FIGS. 6A2, 6B2, and 6C2 are illustration of a flow of air in the case of the single light blocking wall 170 as illustrated in FIG. 4. As illustrated in FIGS. 6A2, 6B2, and 6C2, in the comparative example in which the single light blocking wall 170 is used to block flare light, the single light blocking wall 170 receives airflow R generated due to the mirror surface 149 of the polygon mirror 49 pushing out air. Thus, the light blocking wall 170 receives a significant wind load, subjected to elastic deformation so as to tilt toward the polygon mirror rotation direction. Vibration is thus caused in the light blocking wall 170 and may generate noise. The wind load is calculated by multiplying the wind pressure (N/m2) by the area (m2) receiving the wind pressure.

As illustrated in FIGS. 6A1, 6B1, and 6C1, in the present embodiment, the three light blocking walls 70a, 70b, and 70c receive airflow R generated due to the mirror surface 149 of the polygon mirror 49 pushing out air. As a result, the wind load can be dispersed among the three light blocking walls 70a, 70b, and 70c, resulting in a wind load applied to each light blocking wall being smaller than the wind load applied in the case of the configuration of the comparative example. The light blocking walls can thus be inhibited from undergoing elastic deformation in the rotation direction of the polygon mirrors 49 and from vibrating.

As described above, the third light blocking wall 70c, which is disposed closest to the polygon mirror, has the shortest length and the smallest area that receives the wind pressure of airflow. The wind speed is greater in a location closer to the polygon mirror 49. Since the third light blocking wall 70c is located closest to the polygon mirror and thus receives airflow with high wind speed, the wind pressure received by the third light blocking wall 70c is the strongest of wind pressures received by the three light blocking walls. Thus, the third light blocking wall 70c has the shortest length and the smallest area that receives the wind pressure of airflow in order to minimize the wind load applied to the third light blocking wall 70c. Elastic deformation of the third light blocking wall 70c in the polygon mirror rotation direction can thus be inhibited, which can inhibit vibration of the third light blocking wall 70c.

The first light blocking wall 70a, which is disposed farthest from the polygon mirror 49, receives airflow with reduced wind speed and thus reduced wind pressure. The first light blocking wall 70a thus is unlikely to receive a wind load significant enough to cause significant elastic deformation of the first light blocking wall 70a even if the area receiving the wind pressure of the first light blocking wall 70a is somewhat enlarged. The first light blocking wall 70a thus has an elongated length to block flare light in an enlarged range.

The three light blocking walls 70a, 70b, and 70c are disposed at a predetermined spacing in the rotation direction of the polygon mirrors 49 and satisfies the inequality $\theta1<\theta2$ described above. Timing at which airflow R hits the light blocking walls can thus be shifted, which allows vibration phases of the light blocking walls to be shifted. Resonance of noise generated by vibration of light blocking walls can thus be prevented, which leads to noise reduction.

Disposing the three light blocking walls 70a, 70b, and 70c so as to satisfy the inequality $\theta1<\theta2$ can inhibit generation of vortices in an area downstream of each of the light blocking walls in the polygon mirror rotation direction (hereinafter referred to as back side), thus capable of inhibiting vibration and noise of the light blocking walls. Detailed description is provided below with reference to FIGS. 7A to 7C.

Figure 7A:
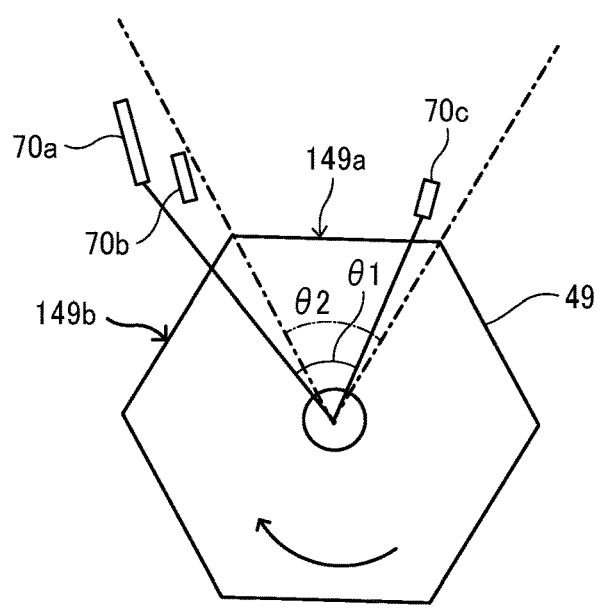
FIG. 7A is an illustration of a comparative example in which three light blocking walls are disposed so as to satisfy an inequality $\theta1>\theta2$.
Figure 7B:
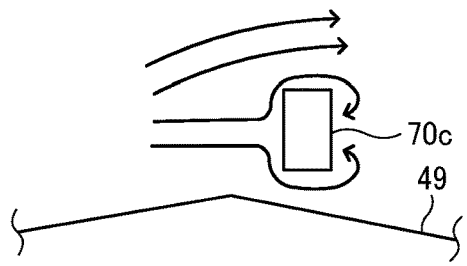
FIG. 7B is an illustration of airflow in the vicinity of a third light blocking wall disposed as in the comparative example of FIG. 7A.
Figure 7C:
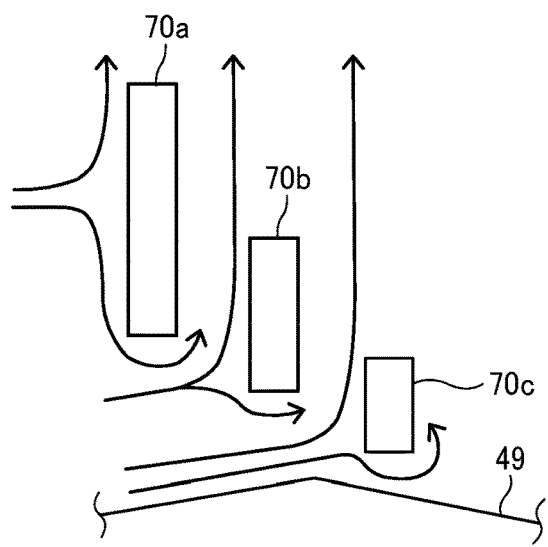
FIG. 7C is an illustration of airflow in the vicinity of a third light blocking wall in an optical scanning device according to an embodiment of the present disclosure.

FIG. 7A is an illustration of aa comparative example in which three light blocking walls 70a, 70b, and 70c are disposed so as to satisfy an inequality $\theta1>\theta2$. FIG. 7B is an illustration of airflow in the vicinity of the third light blocking wall disposed as in the comparative example of FIG. 7A. FIG. 7C is an illustration of airflow in the vicinity of a third light blocking wall in the optical scanning device according to the present embodiment. As illustrated in FIG. 7A, the first light blocking wall 70a and the second light blocking wall 70b receive airflow generated due to a mirror surface 149b pushing out air but do not receive airflow generated due to a mirror surface 149a pushing out air. Thus, as illustrated in FIG. 7B, airflow is generated flowing substantially in the polygon mirror rotation direction in the vicinity of the second end portion of the third light blocking wall 70c, the second end portion being located away from the polygon mirror 49. Airflow that has hit the third light blocking wall 70c and started to flow in a direction away from the polygon mirror 49 flows along the airflow flowing substantially in the polygon mirror rotation direction in the vicinity of the second end portion of the third light blocking wall 70c and flows downstream in the polygon mirror rotation direction. As a result, the airflow flows around the third light blocking wall 70c into the back side of the third light blocking wall 70c (into an area downstream of the third light blocking wall 70c in the polygon mirror rotation direction), generating a vortex on the back side of the third light blocking wall 70c. Airflow that has hit the third light blocking wall 70c and started to flow in a direction toward the polygon mirror 49 also flows downstream in the polygon mirror rotation direction, generating a vortex on the back side of the third light blocking wall 70c. A Karman vortex street in which the vortices occur alternately is thus generated on the back side of the third light blocking wall 70c, possibly aggravating vibration of the third light blocking wall 70c. The occurrence of a Karman vortex street may also cause air to vibrate regularly on the back side of the third light blocking wall 70c, generating noise.

In the present embodiment, in which the three light blocking walls 70a, 70b, and 70c are disposed so as to satisfy the inequality $\theta1<\theta2$ described above, the second light blocking wall 70b and the first light blocking wall 70a receive airflow in an area upstream of the third light blocking wall 70c, the airflow flowing in the rotation direction as illustrated in FIG. 7C. No airflow in the polygon mirror rotation direction is thus generated in the vicinity of the second end portion of the third light blocking wall 70c, the second end portion being located away from the polygon mirror 49. Thus, airflow that has hit the third light blocking wall 70c and started to flow in a direction away from the polygon mirror 49 largely continues to flow in the direction away from the polygon mirror 49 without changing the direction. Airflow flowing around the third light blocking wall 70c into the back side of the third light blocking wall 70c is hardly generated. As a result, generation of a vortex on the back side of the third light blocking wall 70c in an area located away from the polygon mirror is inhibited. Generation of a Karman vortex street on the back side of the third light blocking wall 70c can be inhibited, which can inhibit aggravation of vibration in the third light blocking wall 70c. Generation of noise due to a Karman vortex street can also be inhibited.

Furthermore, airflow that has hit the second light blocking wall 70b and started to flow in a direction away from the polygon mirror 49 is prevented from flowing around the second light blocking wall 70b into the back side of the second light blocking wall 70b by airflow located on the back side of the second light blocking wall 70b and flowing in a direction away from the polygon mirror 49. The airflow that has hit the second light blocking wall 70b and started to flow in the direction away from the polygon mirror 49 thus continues to flow in the direction away from the polygon mirror 49, generating no vortices on the back side of the second light blocking wall 70b in an area located away from the polygon mirror. As a result, a change of atmospheric pressure on the back side of the second light blocking wall 70b can be inhibited, which can also inhibit vibration of the second light blocking wall 70b. For similar reasons, generation of a vortex on the back side of the first light blocking wall 70a in an area located away from the polygon mirror is also prevented, and vibration of the first light blocking wall 70a is also inhibited.

As described above, disposing the three light blocking walls 70a, 70b, and 70c so as to satisfy the inequality θ1<θ2 can inhibit generation of vortices on the back side of each of the light blocking walls, thus capable of inhibiting vibration and noise of the light blocking walls.

Figure 8:
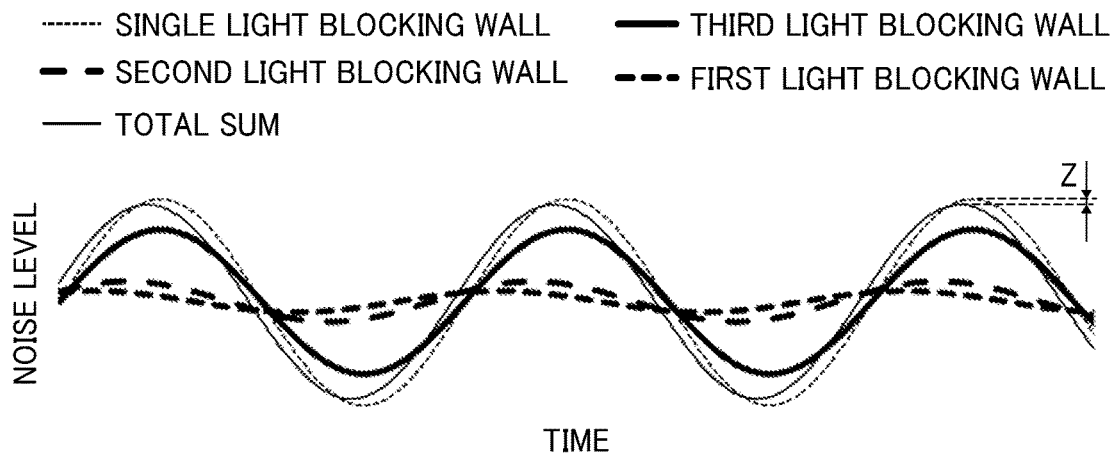
FIG. 8 is a graph indicating noise levels caused by vibration of the single light blocking wall in the optical scanning device according to the comparative example of FIG. 4 and noise levels caused by vibration of each of the plurality of light blocking walls in the optical scanning device according to an embodiment of the present disclosure.
Figure 9:
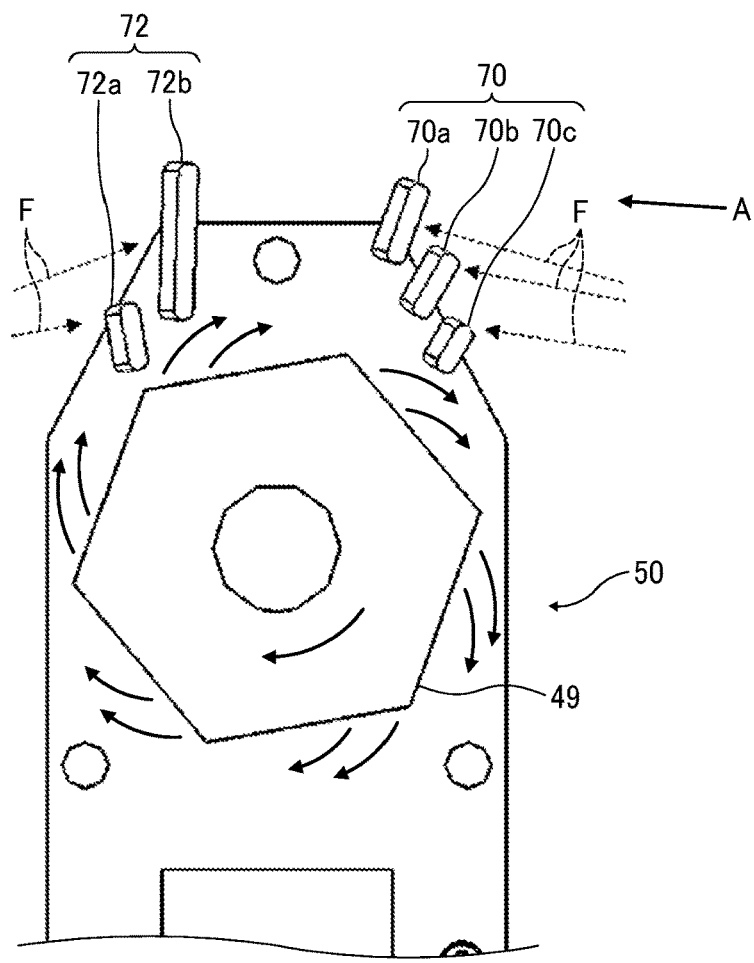
FIG. 9 is a plan view of an area near a polygon scanner in an optical scanning device according to a variation of the present disclosure.

FIG. 8 is a graph indicating noise levels caused by vibration of the single light blocking wall in the optical scanning device according to the comparative example of FIG. 4 and noise levels caused by vibration of each of the plurality of light blocking walls in the present embodiment.

As can be seen in FIG. 8, in the present embodiment, the wind load can be dispersed among the three light blocking walls 70a, 70b, and 70c as described above, a reduced wind load being applied to each light blocking wall. Thus, elastic deformation of each of the light blocking walls 70a, 70b, and 70c in the rotation direction of the polygon mirrors 49 can be inhibited, resulting vibration in each light blocking wall being smaller than vibration of the single light blocking wall of the configuration of the comparative example. As a result, the level of noise due to vibration of each of the light blocking walls can also be reduced so as to be lower than the level of noise of the configuration of the comparative example. Furthermore, since the phases of vibration of the light blocking walls are shifted, the total sum of noise levels due to vibration of the light blocking walls can be also reduced so as to be lower than the noise level of the configuration of the comparative example by an amount indicated by Z in FIG. 8.

A variation of the present embodiment is described next.
FIGS. 9 to 12 are diagrams illustrating a variation of the present embodiment.

As illustrated in FIGS. 9 to 12, the variation includes four light blocking structures, each including a plurality of light blocking walls.

A first light blocking structure 70 is provided to block flare light that is generated when the light beam Lc, having been deflected by the upper polygon mirror 49a to scan, reflects off the scanning lens 25CY. The first light blocking structure 70 includes three light blocking walls 70a, 70b, and 70c. The placement and configuration of the three light blocking walls 70a, 70b, and 70c are similar to the placement and configuration of the light blocking structure according to the embodiment illustrated in FIG. 5. Specifically, the light blocking walls located further downstream in the polygon mirror rotation direction are closer to the polygon mirror. Additionally, the light blocking walls located further downstream in the polygon mirror rotation direction have shorter lengths.

A second light blocking structure 71 is disposed under the first light blocking structure 70. The second light blocking structure 71 blocks flare light that is generated when the light beam Ly, having been deflected by the lower polygon mirror 49b to scan, reflects off the scanning lens 25CY. The second light blocking structure 71 has a configuration similar to the configuration of the first light blocking structure 70 and includes three light blocking walls 71a, 71b, and 71c.

A third light blocking structure 72 is disposed upstream of the first light blocking structure 70 in the polygon mirror rotation direction. The third light blocking structure 72 blocks flare light that is generated when the light beam Lm, having been deflected by the upper polygon mirror 49a to scan, reflects off the scanning lens 25KM. The third light blocking structure 72 includes two light blocking walls 72a and 72b. In the third light blocking structure, the light blocking wall 72a is disposed upstream of the light blocking wall 72b in the polygon mirror rotation direction. The light blocking wall 72a is closer to the polygon mirror than the light blocking wall 72b is. The light blocking wall 72a has a length shorter than the length of the light blocking wall 72b.

A fourth light blocking structure 73 is disposed under the third light blocking structure 72. The fourth light blocking structure 73 blocks flare light that is generated when the light beam Lk, having been deflected by the lower polygon mirror 49b to scan, reflects off the scanning lens 25KM. The fourth light blocking structure 73 has a configuration similar to the configuration of the third light blocking structure 72 and includes two light blocking walls 73a and 73b.

In the case of the third and fourth light blocking structures also, airflow R generated due to a mirror surface of the polygon mirror 49 pushing out air is received by the respective two light blocking walls, the wind load being dispersed by the light blocking walls. The light blocking walls can thus be inhibited from undergoing elastic deformation in the rotation direction of the polygon mirrors 49 and from vibrating.

Figure 10:
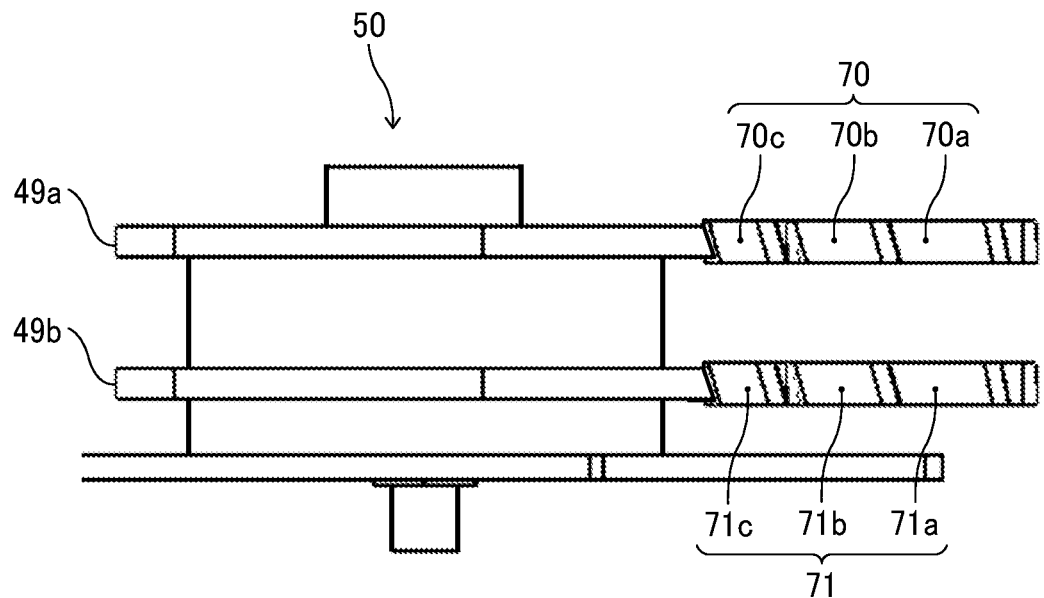
FIG. 10 is a side view of the area near the polygon scanner in the optical scanning device of FIG. 9.

In the variation, placing the light blocking structures for blocking upper flare light and the light blocking structures for blocking lower flare light separately can provide a clearance between the upper polygon mirror 49a and the lower polygon mirror 49b as illustrated in FIG. 10. This placement can enable airflow generated due to the rotation of the polygon mirrors to escape from the clearance between the light blocking structures that block upper flare light and the light blocking structures that block lower flare light. The placement of the variation can thus have a smaller amount of airflow that hits the light blocking walls than the placement of the single light blocking structure that blocks upper and lower flare light. Thus, the placement of the variation can inhibit vibration of the light blocking walls.

Figure 11:
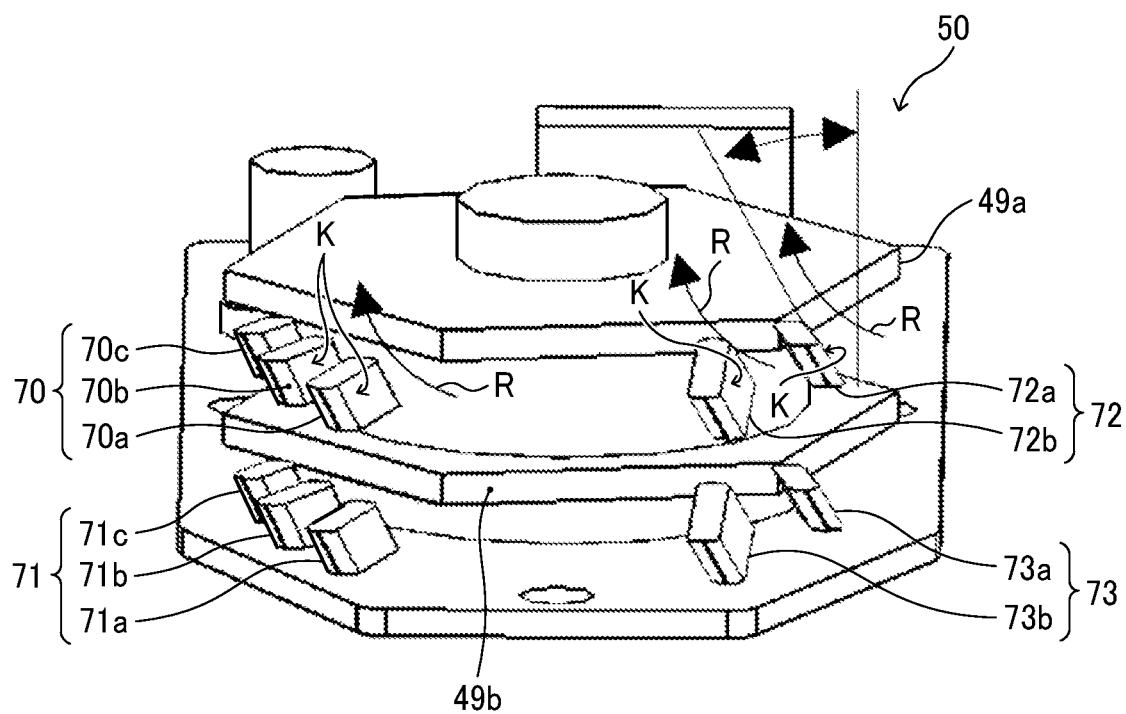
FIG. 11 is a perspective view of the area near the polygon scanner in the optical scanning device of FIG. 9.
Figure 12:
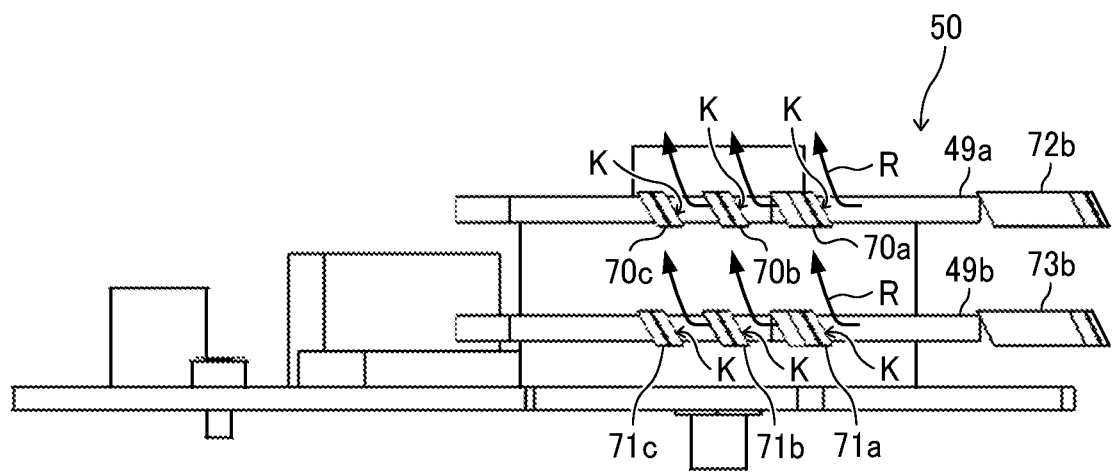
FIG. 12 is an illustration of airflow that has hit light blocking walls in the optical scanning device of FIG. 9.

As illustrated in FIGS. 11 and 12, the light blocking walls according to the variation include airflow receiving surfaces K for receiving airflow R, the airflow receiving surfaces K being tilted in an up-and-down direction (the rotation axis direction of the polygon mirrors). The airflow receiving surfaces K of the light blocking walls tilted as described above can facilitate causing airflow R to flow in the up-and-down direction, thus capable of contributing to reduction of wind pressure applied to each of the light blocking walls and inhibiting vibration in each of the light blocking walls.

In the variation, the airflow receiving surfaces K of the light blocking walls are tilted so that an upper portion of each airflow receiving surface K (opposite the board of the polygon mirror) as illustrated in FIGS. 11 and 12 is located downstream of a lower portion of the corresponding airflow receiving surface K in the polygon mirror rotation direction. Airflow that has hit the light blocking walls thus flows upward. The board is located below the polygon mirrors 49 where space is restricted, whereas some space is available above the polygon mirrors.

A mirror surface 149 of the polygon mirror 49 pushing out air leads to negative pressure in an area near the mirror surface 149, causing air to flow into the area near the mirror surface 149. The air that flows into the area near the mirror surface 149 mainly comes from an area above the polygon mirrors 49 where larger space is available. A negative pressure is thus applied to the area above the polygon mirrors, causing air to flow into the area above the polygon mirrors. Airflow that has hit the light blocking walls is caused to flow upward to flow into the area above the polygon mirrors 49. As a result, circulating airflow occurs around the polygon mirrors, stabilizing airflow around the polygon mirrors, generating laminar flow. Noise caused when the polygon mirrors 49 rotate can thus be reduced.

In the case of the lower polygon mirror 49b, air may flow into an area near the mirror surfaces from below. In that case, the airflow receiving surfaces K of the light blocking walls of the second light blocking structure 71 and the fourth light blocking structure 73 may be tilted so that the lower portion of each airflow receiving surface K is located downstream of the corresponding upper portion in the polygon mirror rotation direction. This configuration will cause airflow that has hit the light blocking walls to flow downward.

Figure 13:
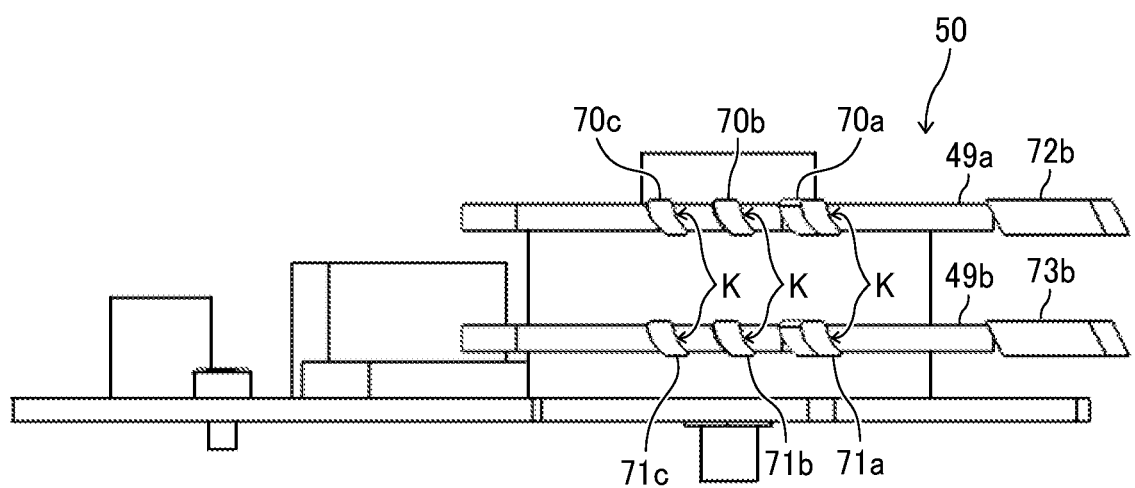
FIG. 13 is a side view of an area near a polygon scanner in an optical scanning device according to another variation of the present disclosure, in which air receiving surfaces of the light blocking walls are curved surfaces.

The airflow receiving surfaces K of the light blocking walls may be curved surfaces as illustrated in FIG. 13. The light blocking walls having curved surfaces can facilitate causing airflow that has hit the light blocking walls to flow upward smoothly. This configuration can further reduce the wind pressure applied to each light blocking wall, thus capable of further inhibiting vibration of each light blocking wall.

The embodiments described above are just examples, and the various aspects of the present disclosure attain respective effects as follows.

Aspect 1

The optical scanning device 4 includes: a plurality of light sources, such as the semiconductor lasers 41K, 41M, 41C, and 41Y; a deflector, such as the polygon mirror 49, including a plurality of mirror surfaces 149 and configured to reflect light beams from the plurality of light sources on the plurality of mirror surfaces while rotating to deflect the light beams into two different directions; an optical element, such as the scanning lens 25, configured to guide a corresponding one of the light beams deflected by the deflector to a corresponding body to be scanned, such as the photoconductors 10K, 10M, 10C, and 10Y, to form an image on the body to be scanned; and a plurality of light blockers, such as the light blocking walls, disposed adjacent to the deflector and configured to block flare light from an optical element facing the deflector, each of the light blockers having an end portion located toward the deflector. When viewed from a rotation axis direction of the deflector, the light blockers are disposed at a predetermined spacing in a rotation direction of the deflector, and an inequality $\theta1<\theta2$ is satisfied, wherein, when viewed from the rotation axis direction, $\theta1$ is an angle formed by a line segment connecting the end portion of a light blocker, such as the third light blocking wall 70c, disposed at a most downstream location in the rotation direction among the plurality of light blockers to a rotation axis center O1 of the deflector and a line segment connecting the end portion of a light blocker, such as the first light blocking wall 70a, disposed at a most upstream location in the rotation direction among the plurality of light blockers to the rotation axis center O1, and $\theta2$ is an angle formed by a line segment connecting an upstream end portion E1 of one of the plurality of mirror surfaces 149 in the rotation direction to the rotation axis center O1 and a line segment connecting a downstream end portion E2 of the one of the plurality of mirror surfaces 149 in the rotation direction to the rotation axis center O1.

Airflow generated due to the rotation of the deflector, such as the polygon mirrors 49, is generated when a mirror surface 149 of the deflector pushes out air. Airflow located at the mirror surface 149 in the rotation axis direction of the deflector has the greatest force and a significant flow rate. For example, in a configuration according to a comparative example, a light blocker, such as a light blocking wall, has a cutout in a lower portion adjacent to a base of a housing, not in a portion facing the mirror surface 149 of the deflector in the deflector rotation axis direction. Airflow having the greatest force and a significant flow rate at the mirror surface 149 is thus received by the single light blocker. The wind load applied to the light blocker causes the light blocker to undergo elastic deformation in the rotation direction of the deflector, posing a risk of not being able to sufficiently inhibit vibration of the light blocker.

In contrast, in Aspect 1, a plurality of light blockers is placed. As compared to the case where the single light blocker is provided to block flare light, providing the plurality of light blockers (the first light blocking wall 70a, second light blocking wall 70b, and third light blocking wall 70c in the present embodiment) to block flare light can lead to a reduced area of each of the light blockers that receives the wind pressure of airflow generated due to the mirror surface 149 of the deflector pushing out air. This configuration can reduce the wind load applied to each light blocker, thus capable of inhibiting elastic deformation of each light blocker in the deflector rotation direction. Additionally, disposing the plurality of light blockers so as to satisfy the inequality $\theta1<\theta2$ can allow the plurality of light blockers to receive airflow generated due to a mirror surface pushing out air, the airflow being divided among the plurality of light blockers. Thus, as illustrated in FIG. 7C, of airflow that has hit the light blockers, airflow flowing along the light blockers in the direction away from the deflector can be inhibited from becoming turbulent. As can be seen from comparison with FIG. 7B, vortices can be inhibited from occurring in an area downstream of the end portion of each light blocker in the rotation direction, the end portion being located away from the deflector. Thus, a change of atmospheric pressure in an area downstream of each light blocker in the rotation direction can be inhibited, which can also inhibit elastic deformation of each light blocker caused by a change of atmospheric pressure. Vibration of each light blocker can thus be inhibited.

Aspect 2

In the optical scanning device of Aspect 1, the end portions of the plurality of light blockers have different distances to the rotation axis center O1.

As described in the embodiment, the plurality of light blockers can receive airflow generated due to a mirror surface pushing out air, the airflow being divided among the light blockers.

Aspect 3

In the optical scanning device of Aspect 1, each of the plurality of light blockers, such as light blocking walls, includes an airflow receiving surface K that is tilted in the rotation direction of the deflector. The airflow receiving surface receives airflow generated due to rotation of the deflector.

As described with reference to FIGS. 11 and 12, the airflow receiving surfaces tilted as described in Aspect 3 can cause airflow that has hit each of the light blockers, such as light blocking walls, to flow in the rotation axis direction of the deflector, thus capable of reducing wind pressure applied to the light blockers. Vibration of each light blocker can thus be inhibited.

Aspect 4

In the optical scanning device of Aspect 3, the airflow receiving surface K is a curved surface curved in the rotation direction of the deflector, such as the polygon mirror 49.

As described with reference to FIG. 13, the curved surfaces can cause airflow that has hit each of the light blockers, such as light blocking walls, to flow in the rotation axis direction of the deflector smoothly, thus capable of further reducing wind pressure applied to each of the light blockers. Vibration of each light blocking wall can thus be further inhibited.

Aspect 5

In the optical scanning device of Aspect 3, the airflow receiving surface K is tilted to cause an end portion of the airflow receiving surface K to be located at a most upstream location in the rotation direction of the deflector, such as the polygon mirror 49, the end portion being located toward a board of the deflector.

As described with reference to FIGS. 11 and 12, the tilted airflow receiving surfaces as described in Aspect 5 can cause airflow that has hit the light blockers, such as light blocking walls, to flow to an area opposite the board of the deflector, such as the polygon mirrors 49. The area opposite the board of the deflector has larger space available, and airflow occurs from this space in the area opposite the board of the deflector toward the deflector. Thus, the light blockers causing the airflow to flow to the area opposite the board of the deflector where larger space is available can generate circulating airflow around the deflector. Airflow around the polygon mirror is thus stabilized, and noise caused when the polygon mirrors rotate can be reduced.

Aspect 6

The optical scanning device of Aspect 1 includes a plurality of light blocking structures, each of the light blocking structures including a plurality of light blockers disposed to satisfy the inequality θ1<θ2. The light blocking structures block flare light located at different locations in the rotation axis direction.

As described in the above-described variation, as compared to the case where the single light blocking structure is provided to block flare light occurring at different locations, Aspect 6 can lead to a reduced area of each of the light blockers, such as light blocking walls, that receives the wind pressure of airflow, thus capable of reducing the wind load applied to each of the light blockers. Thus, elastic deformation of each light blocker can be inhibited, and vibration of each light blocker can be inhibited.

Aspect 7

An image forming apparatus includes: a latent image bearer, such as the photoconductors 10, that has a surface; and an optical scanning device configured to irradiate the surface of the latent image bearer with light to form a latent image on the surface, the latent image being to be developed to obtain an image, the image being to be then transferred onto a recording material to form an image on the recording material. The optical scanning device is the optical scanning device according to Aspect 1.

Aspect 7 can inhibit generation of abnormal images such as streaks and reduce noise of the apparatus.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An optical scanning device comprising:
a plurality of light sources;
a deflector including a plurality of mirror surfaces and configured to reflect light beams from the plurality of light sources on the plurality of mirror surfaces while rotating to deflect the light beams into different directions from each other;
an optical element facing the deflector and configured to guide each one of the light beams deflected by the deflector to corresponding one of a plurality of bodies to be scanned to form an image on the corresponding one of the plurality of bodies to be scanned; and
a plurality of light blockers disposed adjacent to the deflector and configured to block flare light from the optical element facing the deflector, each one of the light blockers having an end portion located toward the deflector,
wherein, when viewed from a rotation axis direction of the deflector, the plurality of light blockers are spaced apart from each other in a rotation direction of the deflector, and
an inequality θ1<θ2 is satisfied,
wherein, when viewed from the rotation axis direction, θ1 is an angle formed by a line segment connecting the end portion of a light blocker disposed most downstream in the rotation direction among the plurality of light blockers to a rotation axis center of the deflector and a line segment connecting the end portion of a light blocker disposed most upstream in the rotation direction among the plurality of light blockers to the rotation axis center, and
θ2 is an angle formed by a line segment connecting an upstream end portion of one of the plurality of mirror surfaces in the rotation direction to the rotation axis center and a line segment connecting a downstream end portion of the one of the plurality of mirror surfaces in the rotation direction to the rotation axis center.

2. The optical scanning device according to claim 1,
wherein the plurality of light blockers have different distances between the end portion of each of the plurality of light blockers to the rotation axis center.

3. The optical scanning device according to claim 1,
wherein each one of the plurality of light blockers includes an airflow receiving surface tilted in the rotation direction of the deflector, the airflow receiving surface being configured to receive an airflow generated by rotation of the deflector.

4. The optical scanning device according to claim 3,
wherein the airflow receiving surface includes a curved surface curved in the rotation direction of the deflector.

5. The optical scanning device according to claim 3,
wherein the airflow receiving surface is tilted to cause an end portion of the airflow receiving surface to be located at a most upstream location of the airflow receiving surface in the rotation direction of the deflector, the end portion being located toward a board of the deflector.

6. The optical scanning device according to claim 1,
further comprising a plurality of light blocking structures, each one of the plurality of light blocking structures including a plurality of light blockers disposed to satisfy the inequality $\theta1<\theta2$,
wherein the plurality of light blocking structures are configured to block flare light at different locations in the rotation axis direction.

7. An image forming apparatus comprising:
a latent image bearer having a surface;
the optical scanning device according to claim 1, configured to irradiate the surface of the latent image bearer with light to form a latent image on the surface,
a developing device configured to develop the latent image to obtain an image; and
a transfer device configured to transfer the image onto a recording material to form an image on the recording material.

* * * * *